No. 645,905. Patented Mar. 20, 1900.
E. YVONNEAU.
ACETYLENE GAS GENERATOR.
(Application filed July 18, 1899.)
(No Model.) 4 Sheets—Sheet 2.
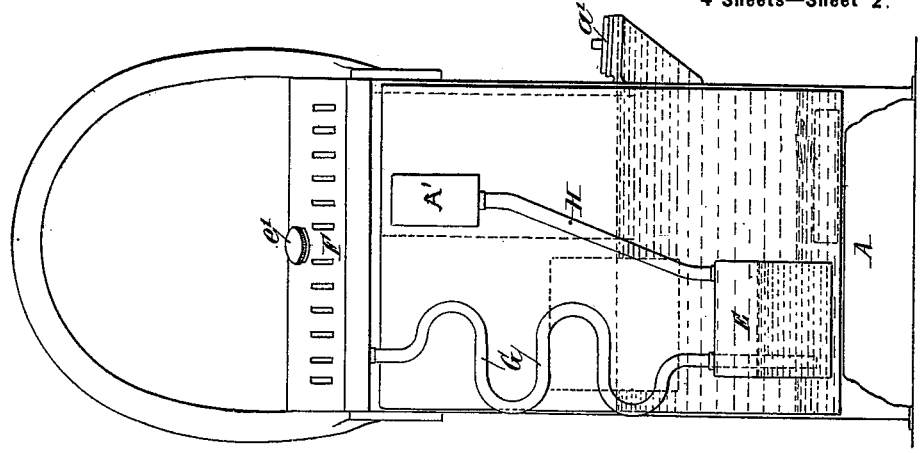
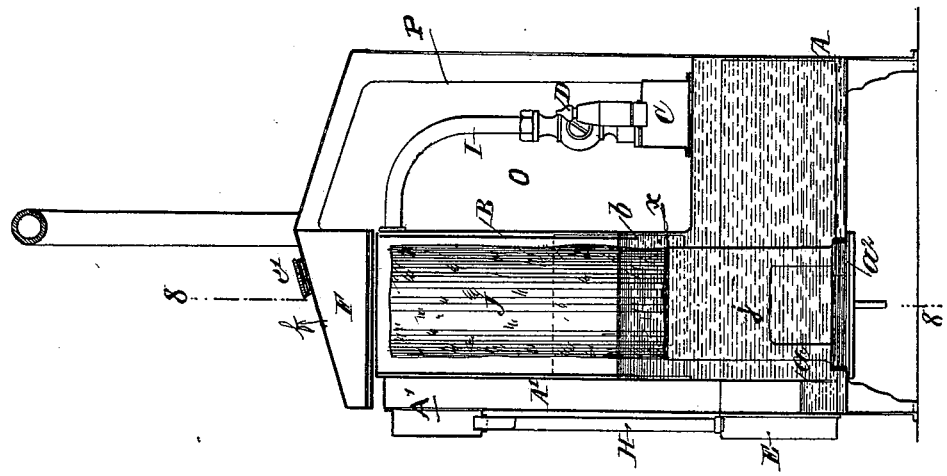
WITNESSES:
F. W. Wright.
J. C. Connor.
INVENTOR
EMMANUEL YVONNEAU
BY Howson and Howson
HIS ATTORNEYS.
THE NORRIS PETERS CO., PHOTO-LITHO., WASHINGTON, D. C.

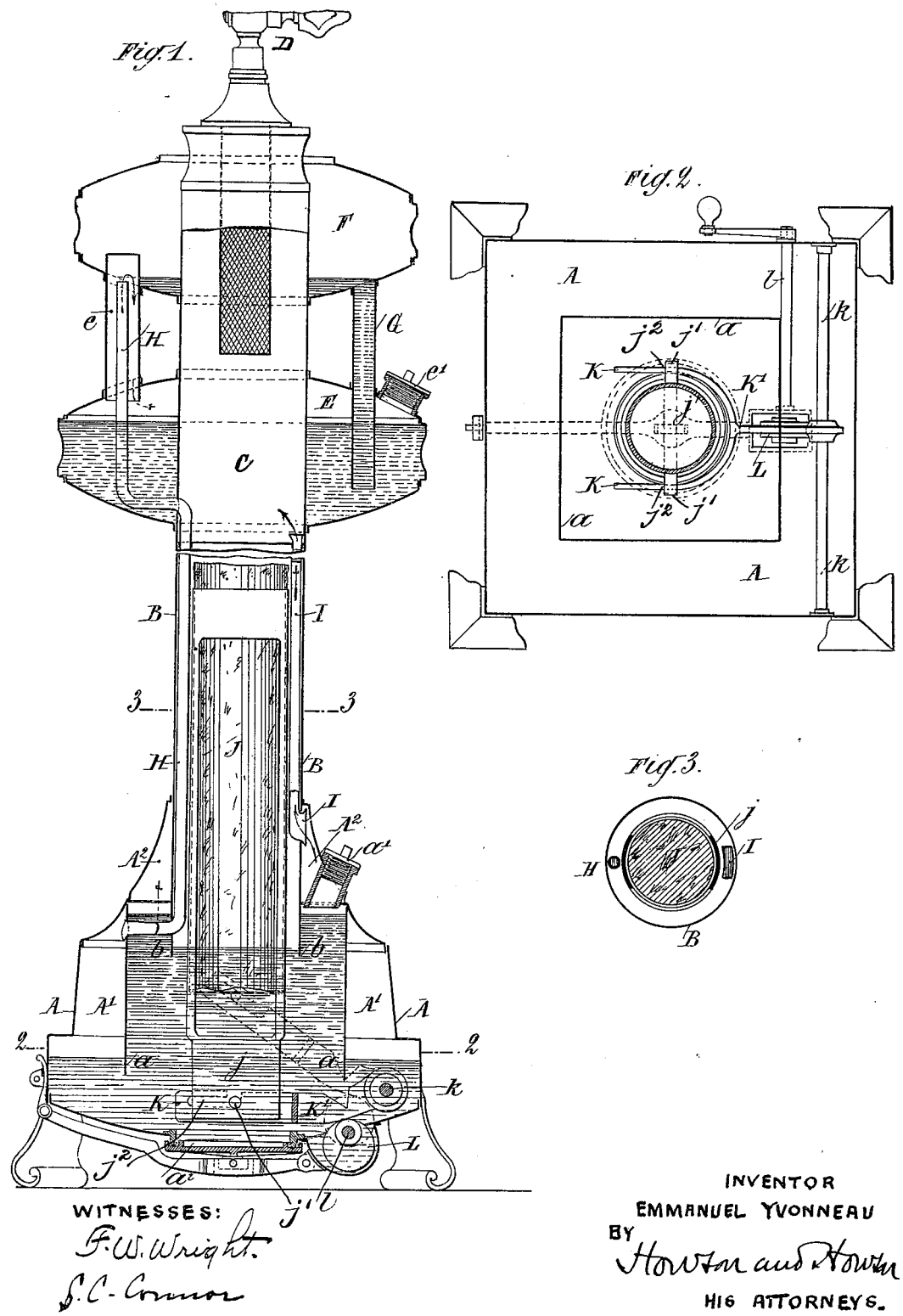

No. 645,905. Patented Mar. 20, 1900.
E. YVONNEAU.
ACETYLENE GAS GENERATOR.
(Application filed July 18, 1899.)
(No Model.) 4 Sheets—Sheet 3.
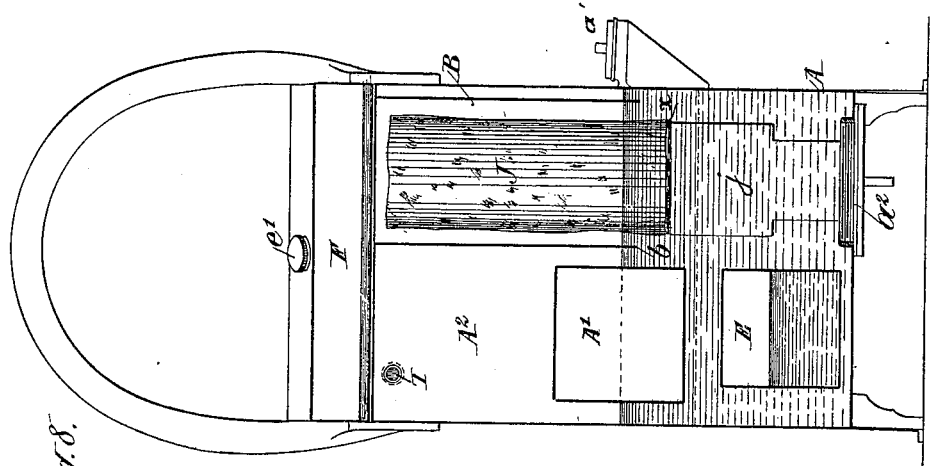
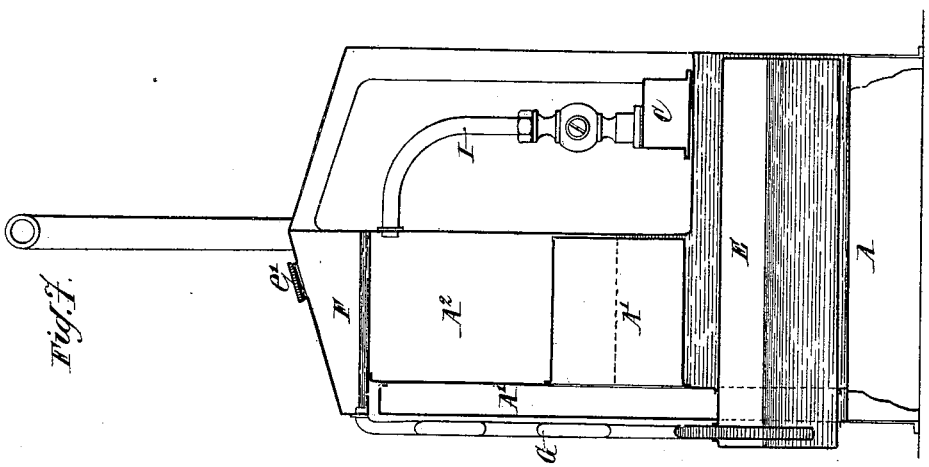
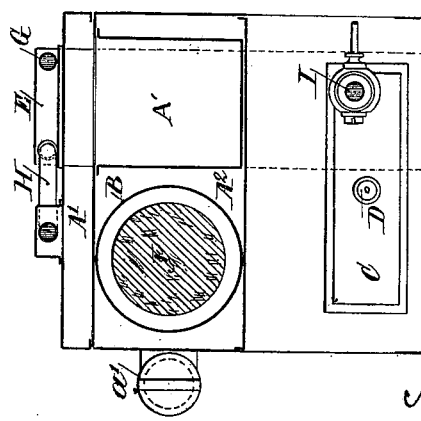
WITNESSES:
F. W. Wright.
INVENTOR
EMMANUEL YVONNEAU
BY
Howson and Howson
HIS ATTORNEYS No. 645,905. Patented Mar. 20, 1900.
E. YVONNEAU.
ACETYLENE GAS GENERATOR.
(Application filed July 18, 1899.)
(No Model.) 4 Sheets—Sheet 4.
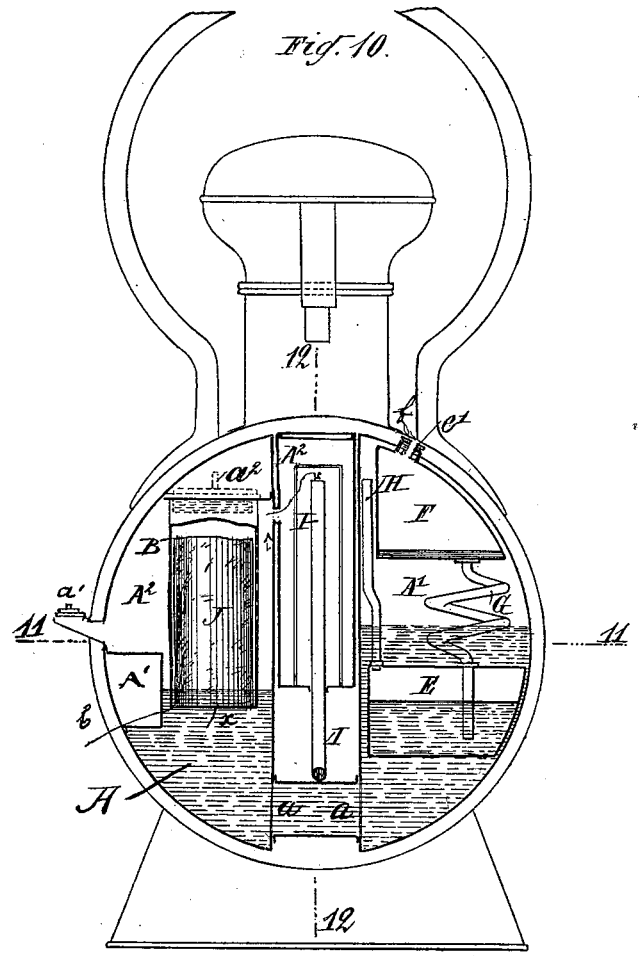
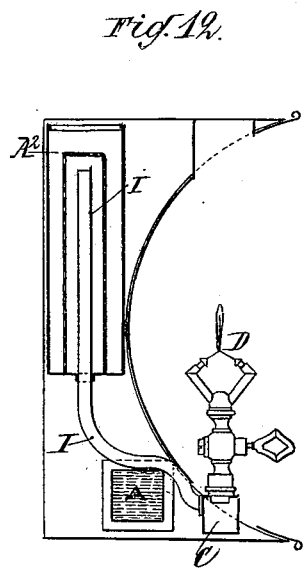
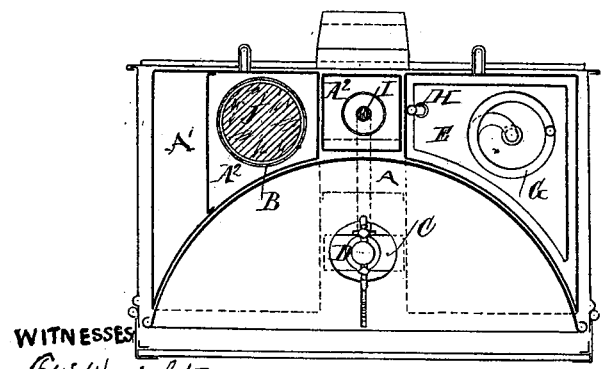
INVENTOR
EMMANUEL YVONNEAU
BY
Howson and Howson
HIS ATTORNEYS.

UNITED STATES PATENT OFFICE.

EMMANUEL YVONNEAU, OF PARIS, FRANCE.

ACETYLENE-GAS GENERATOR.

SPECIFICATION forming part of Letters Patent No. 645,905, dated March 20, 1900.

Application filed July 18, 1899. Serial No. 724,264. (No model.)

*To all whom it may concern:*

Be it known that I, EMMANUEL YVONNEAU, a citizen of the Republic of France, residing at Paris, France, have invented certain new and useful Improvements in Acetylene-Gas Generators, of which the following is a specification.

This invention relates to an apparatus for producing acetylene gas, particularly applicable in the construction of portable lamps and lanterns.

The accompanying drawings show various means for practically carrying out my invention.

Figure 1 illustrates in vertical section a lamp to be used more particularly as a household lamp. Fig. 2 is a section on the line 2 2, Fig. 1. Fig. 3 is a section on the line 3 3, Fig. 1. Figs. 4 to 9 relate to a hand-lantern. Fig. 4 is a front view, Fig. 5 being a horizontal section on line 5 5, Fig. 4. Fig. 6 is a vertical section on line 6 6, Fig. 4. Fig. 7 is a vertical section on line 7 7, Fig. 4. Fig. 8 is a similar section on the line 8 8, Fig. 6. Fig. 9 is a rear view of the lantern. Figs. 10 to 12 relate to a lantern for railways, motor-cars, &c. Fig. 10 is a vertical section. Fig. 11 is a horizontal section on line 11 11, Fig. 10; and Fig. 12 is a perpendicular section on line 12 12, Fig. 10.

I will first describe the lamp shown on Figs. 1 and 2, and according thereto I will explain the characteristics and working of my invention. This lamp comprises a pedestal or socket A, forming the generating apparatus or receptacle in which is contained the water or liquid acting on the calcium carbid. Within is a wall $a$, descending below the lowest possible water-level. There are thus two chambers—$A'$ above the level of the water exterior to this wall $a$ and $A^2$ above the level of the water within the wall $a$. Within the inner space defined thereby passes down a large tube B, which opens at $b$ into this space. This tube is intended to contain the carbid mass. It is closed, except at its end $b$. At its upper end it serves as a support for another length of tube C, forming a drying-chamber and ending in a burner D. Two superposed receivers E and F are arranged at the upper portion of the apparatus. They can easily be put in place, being located annularly around tubes C and B. The lower reservoir E contains a certain quantity of a suitable liquid, and into the base of the upper receiver F there opens a tube G, which descends to the bottom of this reservoir. Chamber $A'$, which is formed by the water in the pedestal of the apparatus exteriorly to the wall $a$, communicates by a tube H with the air-space of receiver E, so that the liquid of this latter cannot accidentally enter the tube H. This latter opens into a pocket $e$, arranged upon the upper face of this receiver E. The chamber $A^2$, formed by the water in the generator A within the wall $a$, communicates by a tube I with the drying-receiver C, whence the gas passes to the burner. Calcium carbid in any suitable form, either in small lumps contained in a basket or preferably in the form of a candle or stick J, is located in the tube B, whence it passes down into the water of the generator A inside the wall $a$. This candle J is supported in a cup $j$, furnished with projections $j'$ $j'$, which engage open slots $j^2$ in two arms K K, integral with a lever $K'$, pivoted on an axis $K^2$. Under this lever is arranged a roller L, mounted eccentrically on an axis $l$. By rotating this latter lever $K'$ can in this way be raised or lowered, and with it the carbid candle, thus plunging it into the water at the time of working or raising it out of the liquid when not in use. The carbid can be introduced through a door $a^2$. This apparatus works in the following manner: To use the lamp, the axis $l$ is so turned as to cause the candle J to descend, which during the non-working periods is raised completely out of the water. This candle J is then immersed at its lower part, and by reason of the reaction caused by the contact of the water with the carbid acetylene gas is generated. This gas fills tube B, escapes at the end $b$ of said tube B, passes out at the surface of the water within the interior of the wall $a$, fills the chamber $A^2$, whence by the tube I it proceeds to the drying-chamber and thence to the burner. This gas thus exercises a certain pressure on the water-surface in the chamber $A^2$. If the generation exceeds the requirement of the burner, the level is lowered and the carbid-surface attacked by the water is lessened, the production being thus reduced. The level having been lowered at $A^2$ it rises at $A'$ and compresses the air confined in the chamber $A'$, as well as in the tube H and in the reservoir E above the level of the liquid in this reservoir. This mass of air being thus compressed exerts a pressure on the surface of the liquid in the said reservoir E, which liquid consequently rises in the tube G and fills the reservoir F to a greater or less extent. The level being lowered in $A^2$ and the carbid-surface which is being acted upon being thus diminished, the pressure of gas will also diminish, and the level in $A^2$ rises again under the action of the confined air, which, being compressed, tends to expand, the level in $A'$ falling, while the level in $A^2$ rises. At the same time the water which passed from the reservoir E into the reservoir F again descends into the first. The reservoirs or receivers E and F, operating in conjunction with the compartments $A'$ and $A^2$, constitute an automatic pressure-regulating means, and the same series of phenomena will be reproduced continually, the result being that the pressure of gas in the apparatus is maintained quite constant at a predetermined degree, and the flame of the burner is particularly steady. The degree of pressure may be varied by altering different parts of the apparatus—the initial pressure of the confined gaseous mixture, the density of the liquid in the receivers E and F, for example. In addition it is to be noted that the water acting on the carbid is never in contact with the outer atmosphere, since between this latter and the surface of the water $A'$ is interposed the confined gaseous mixture and liquid contained in E. The result is that there is no smell.

I do not insist on any special form of accessory details of the apparatus, such as the plugs $a'$ and $e'$, the drying and purifying substances which may be placed in the receiver C, the burner, &c.

I do not limit myself to the whole arrangement and the shape of the apparatus shown on Figs. 1 and 2, and I may impart to the various portions of my apparatus other forms in consonance with the principle of the invention, the accessory parts, such as the arrangement for raising and lowering the carbid candle, being variable or they may even be dispensed with.

I have shown on Figs. 4 to 9 a modification relating to a hand-lamp. All the essential points of the previously-described type are herein embodied and for the same purpose. In the following description the same letters refer to the same or corresponding parts of the device shown in Figs. 1 to 3. The generating water-reservoir A in this modification, occupying the lower portion of the lamp within this reservoir, is the wall $a$, descending below the lowest possible water-level. There are two chambers—$A'$ above the level of the water exterior to this wall $a$ and $A^2$ above the level of the water within the wall $a$. Within the inner space defined thereby is a large tube B, which opens at $b$ into this space. This tube is intended to contain the carbid mass. It is closed except at its lower end $b$. Two reservoirs E and F are arranged within the lamp. The lower reservoir E contains a certain quantity of a suitable liquid. A tube C connects the lower E with the upper reservoir F, said tube terminating at its lower end near the bottom of the reservoir E. The chamber $A'$, which is formed by the water in the generating-reservoir A, extending to the wall $a$, communicates by a tube H with the space above the water in the reservoir E. The chamber $A^2$ communicates by a tube I with the drying-chamber C, whence the gas passes to the burner. Calcium carbid J in any suitable form is placed in the tube B through the door $a^3$. Said carbid is supported on a grid $x$, attached on the base-support $j$. The working of this apparatus is as follows: Carbid is introduced through $a^2$. Liquid is then poured into the reservoir E of known capacity by $c'$ and into A by the opening $a'$. By the reaction caused by the contact of the water with the carbid acetylene gas is generated. This gas fills tube B, escapes at the end $b$ of said tube B, passes out of the surface of the water, within the interior of the well $a$, fills the chamber $A^2$, whence by the tube I it proceeds to the drying-chamber C, and thence to the burner. This gas thus exercises a certain pressure on the water-surface in the chamber $A^2$. If the generation exceeds the requirement of the burner, the level is lowered, and the carbid-surface of the water is lessened, the production being thus reduced. The level having been lowered at $A^2$, it rises at $A'$ and compresses the air confined in the chamber $A'$, as well as in the tube H and in the space of the reservoir E above the level of the liquid in this reservoir. This mass of air being compressed exerts a pressure on the surface of the liquid in the said reservoir E, which liquid consequently rises in the tube G and fills the reservoir F to a greater or less extent. The level being lowered in $A^2$ and the carbid surface which is being acted upon being thus diminished, the pressure of gas will also diminish and the level in $A^2$ rise again under the action of the confined air, which being compressed tends to expand, the level in $A'$ falling, while the level in $A^2$ rises. At the same time the water which passed from the reservoir E into the reservoir F again descends into the first. The tube G is preferably sinuous or coiled, so as to avoid too abrupt movements of the liquid. The reservoir or receivers E and F, operating in conjunction with the compartments $A'$ and $A^2$, constitute an automatic pressure-regulating means, and the same series of phenomena will be produced continually, the result being that the pressure of gas in the apparatus is maintained quite constant at a predetermined degree, and the flame of the burner is particularly steady. The degree of the pressure may be varied by altering different elements acting in the apparatus—for example, the initial pressure of the confined gaseous mixture and the density of the liquid in the receiver E. The burner is located in the free space O, which can be closed by means of glasses applied on P. The upper compartment F is in communication with the atmosphere by means of the opening $f$.

I do not confine myself to any special form of the apparatus or its auxiliary details, neither in the disposition of the chambers, reservoirs, tube, &c., which I may vary in keeping with the principle of my invention. The carbid may also be introduced by the top of the apparatus, liquid poured by different openings, and the apparatus may be provided with means for raising and lowering the carbid at will without departing from the spirit of my invention.

Figs. 10 to 12 relate to another modification. There are again shown the water-reservoir A, its partition $a$, and the chambers A' A². The compressed air is confined in A', the tube H, and the reservoir E. This latter communicates with the reservoir F by a coiled tube G. The gas passes from A² to the desiccator C by a tube I, and thence to the burner D.

In Figs. 10 to 12 the same letters refer to the same parts as in Figs. 4 to 9, and the operation of the apparatus is exactly the same. Here the carbid is placed in the lamp by the top in $a^2$. Water is poured in A² by $a'$ on the side and in E by $e'$, which has an opening $f$, so as to make the chamber F communicate with the atmosphere.

I have shown my invention applied to lamps; but it is obvious that I can also use it for separate or independent generators.

I claim as my invention—

1. An acetylene-gas-producing apparatus, having a generator to contain water to act on the carbid, said generator having two communicating compartments wherein the water assumes its proper level, one compartment containing the carbid and its gaseous atmosphere communicating with the consuming apparatus, the second, in the space above the water, being in communication with the air-space of a receiver containing a liquid, which thus forms a closed space inclosing a confined quantity of a gaseous fluid such as air, the said receiver being in communication with another receiver, in such a manner that the liquid driven back or compressed in the first of these receivers by reason of the compression of the confined gaseous body by the rise of water in the second compartment of the generator, rises into the second receiver and can return therefrom into the first when the compression, the cause of this flow, ceases, as above described and set forth.

2. An acetylene-gas-producing apparatus having a generator to contain water to act on the carbid, said generator having two communicating compartments wherein the water assumes its proper level, the first compartment containing the carbid and its gaseous atmosphere communicating with the consuming apparatus in combination with an automatic pressure-regulating means comprising a reservoir of liquid whose air-space part is in communication with the upper part of the said second compartment, while the liquid-space of said reservoir is open to the surrounding atmosphere, as and for the purpose described.

In testimony whereof I have signed my name to this specification in the presence of two subscribing witnesses.

EMMANUEL YVONNEAU.

Witnesses:
LÉON FRAUCKEN,
EDWARD P. MACLEAN.